M. E. GEIGER.
SHORTENING MIXER.
APPLICATION FILED MAR. 21, 1922.
1,417,985.
Patented May 30, 1922.
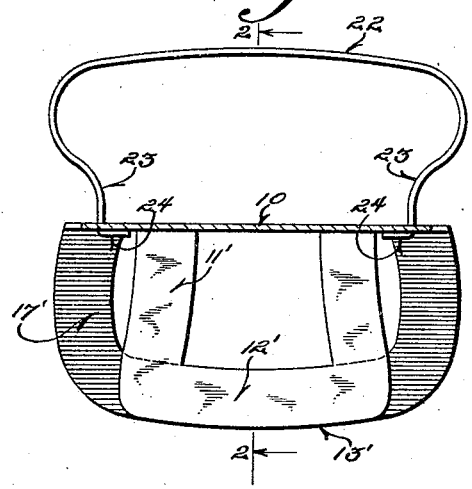
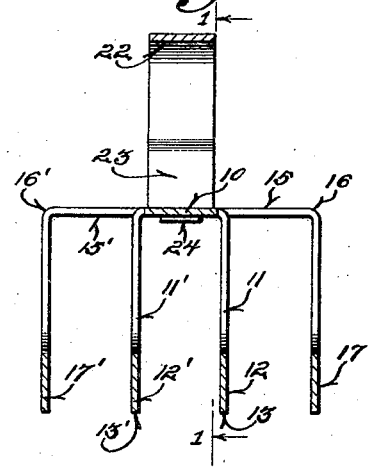
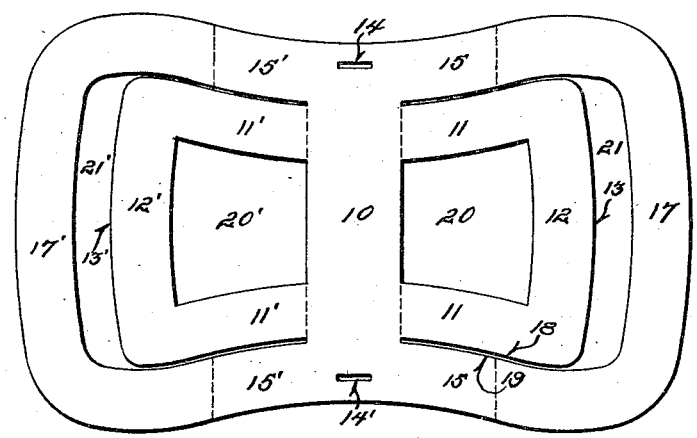

UNITED STATES PATENT OFFICE.

MARY E. GEIGER, OF WAUKESHA, WISCONSIN.

SHORTENING MIXER.

1,417,985. Specification of Letters Patent. Patented May 30, 1922.

Application filed March 21, 1922. Serial No. 545,409.

*To all whom it may concern:*

Be it known that I, MARY E. GEIGER, a citizen of the United States, and resident of Waukesha, in the county of Waukesha and State of Wisconsin, have invented certain new and useful Improvements in Shortening Mixers; and I do hereby declare that the following is a full, clear, and exact description thereof.

The invention relates to shortening mixing devices.

It comprises a one-piece body which is adapted to be stamped or cut out of metal, four wings being formed, adapted to be bent downwardly and terminate with substantially alined scraping edges. A handle, of band iron, is affixed to the mixer through slots in the top thereof.

An object of the invention is the provision of a mixer having a one-piece body and blade structure, which is, therefore, strong and durable, not liable to breakage and which is exceedingly inexpensive to manufacture.

The process of forming the mixer is very simple, the body portion being cut or stamped out of sheet metal or steel and merely bent downwardly.

An important object of the invention is the provision of a device, which is efficient in operation. The downwardly directed wings are provided with openings which are substantially alined and which prevent the clogging of the material. The device is designed to mix lard, butter, or vegetable fats with flour or sugar, quickly producing a thorough granulated mixture. It facilitates the mixing without the handling of the ingredients and the product is lighter and more porous than that which has been handled. Less butter and vegetable fat is required in the mixing operation, because of the functioning of the device, and, therefore, the pie crust, cake, pastry, or other product is rendered more digestible.

With the above and other objects in view, which will appear as the description proceeds, my invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of the present invention constructed according to the best mode I have so far devised for the practical application of the principles thereof, and in which:

Figure 1 is a central, sectional elevation on the line 1—1 of Figure 2.

Figure 2 is a cross section on the line 2—2 of Figure 1.

Figure 3 is a view of the device as it appears when cut out of a blank.

The device comprises a central plate 10 from which on either side side straps 11—11' extend downwardly and are gradually directed outwardly, terminating in wings 12—12' having a curved scraping edge 13—13'. At the extreme ends of plate 10 transverse slots 14—14' are cut out. Bands 15—15' are directed laterally away from plate 10, but are on the same plane therewith. The bands are bent downwardly at 16—16' and terminate in wings 17—17'. The distance between bands 15 is greater adjacent wings 17 than at plate 10.

In the manufacture of the device, the body portion of the mixer is stamped or cut from steel, or other sheet metal, and the wings are bent downwardly. After the stamping operation, the parts are extended, as shown in Figure 3, in which the edge 18 of strap 11 is parallel with the edge 19 of band 15 and spaced slightly therefrom so that a minimum of material is utilized. The cutting results in the formation of openings 20—20' and 21—21'. As wing 17 is spaced only slightly from wing 12, very little material is lost between these wings, during the stamping operation.

A handle 22 of band iron, or other suitable material, having a substantially horizontal upper portion 22, is bent downwardly and formed into legs 23 curved inwardly and terminating in flanges 24 received in slots 14—14'. The flanges operate to secure the handle to the body portion and prevent relative movement of parts. The entire device may be plated with tin, nickel, or any suitable coating.

I claim:—

1. In a shortening mixer, the combination of a plate, a pair of metallic straps on each side thereof and integral therewith, a pair of wings, each of said wings being integral with a pair of said straps, a second pair of wings, a second pair of straps on each side and integral with said plate, each of said second pairs of straps being integral with one of said second mentioned wings.

2. In a shortening mixer, the combination of a plate, a pair of downwardly directed wing members integral with said plate, and having openings therein, a second pair of downwardly directed members integral with said plate and spaced laterally away from said first mentioned pair of wing members, said plate having a pair of slots therein, and a metallic handle having its ends extending through said slots and bent to contact with said plate.

In testimony that I claim the foregoing I have hereunto set my hand at Waukesha, in the county of Waukesha and State of Wisconsin.

MARY E. GEIGER.